Sept. 24, 1929. J. A. WEISENSEL ET AL 1,729,314
CLOVER RAKE AND PILER ATTACHMENT FOR MOWERS
Filed March 10, 1924 4 Sheets-Sheet 1
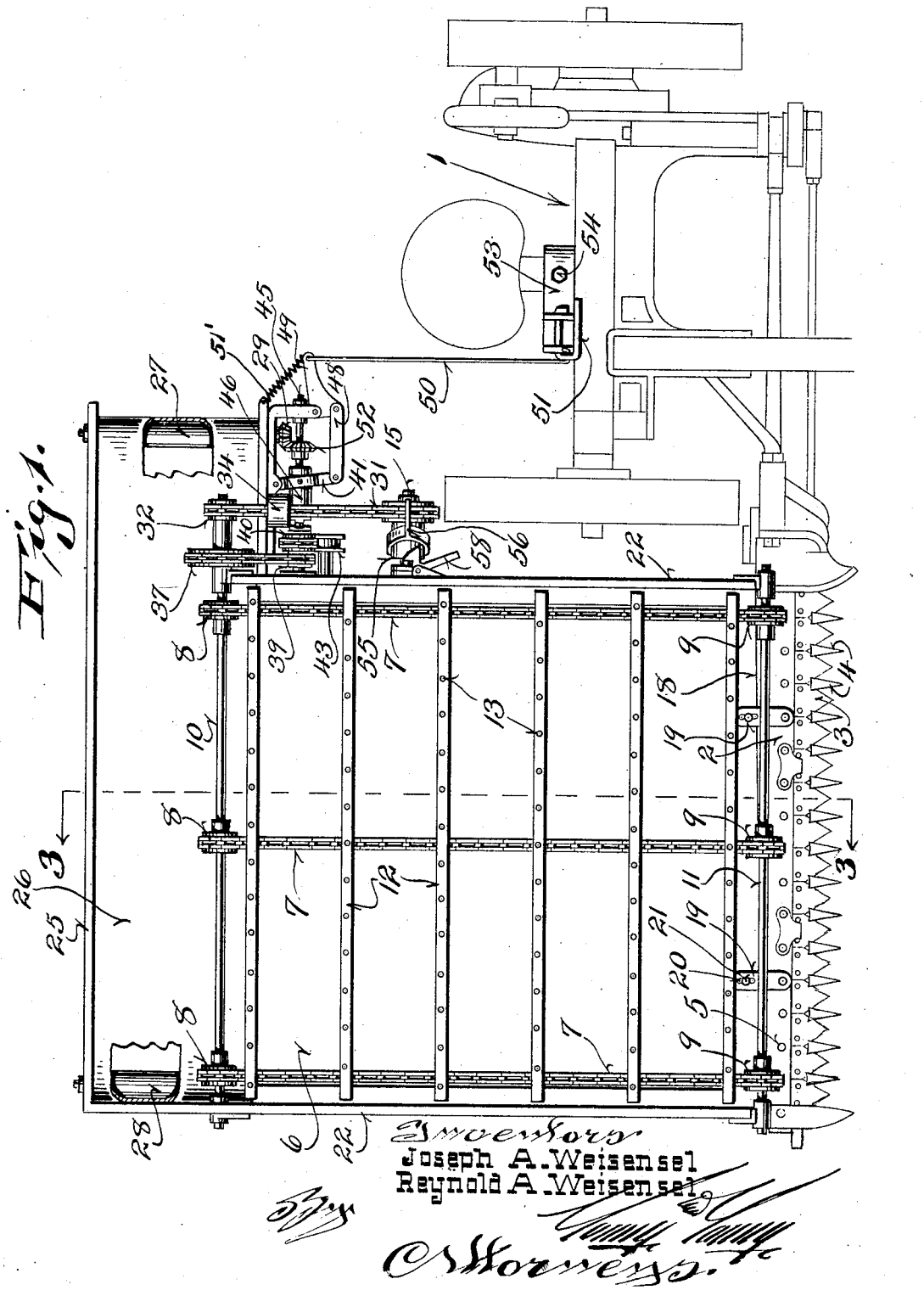

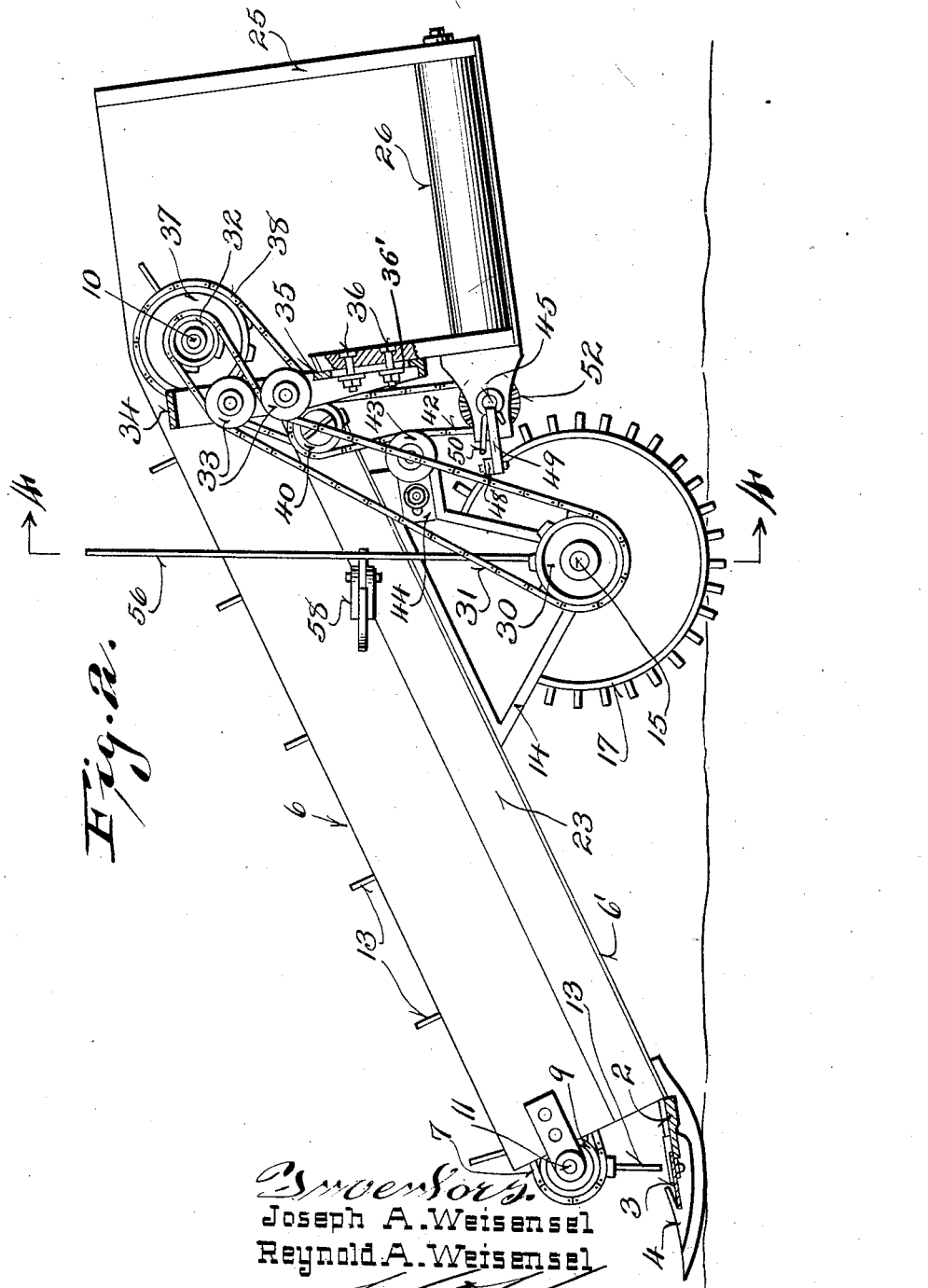

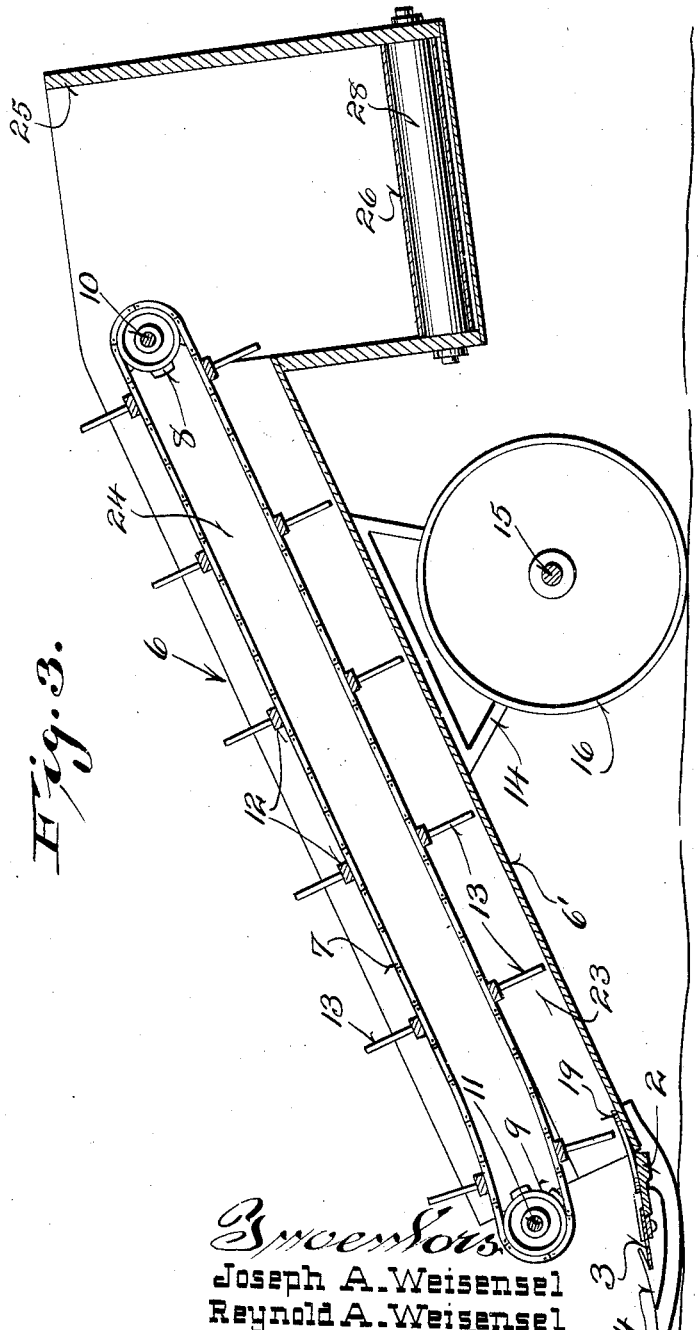

Sept. 24, 1929.  J. A. WEISENSEL ET AL  1,729,314
CLOVER RAKE AND PILER ATTACHMENT FOR MOWERS
Filed March 10, 1924  4 Sheets-Sheet 4
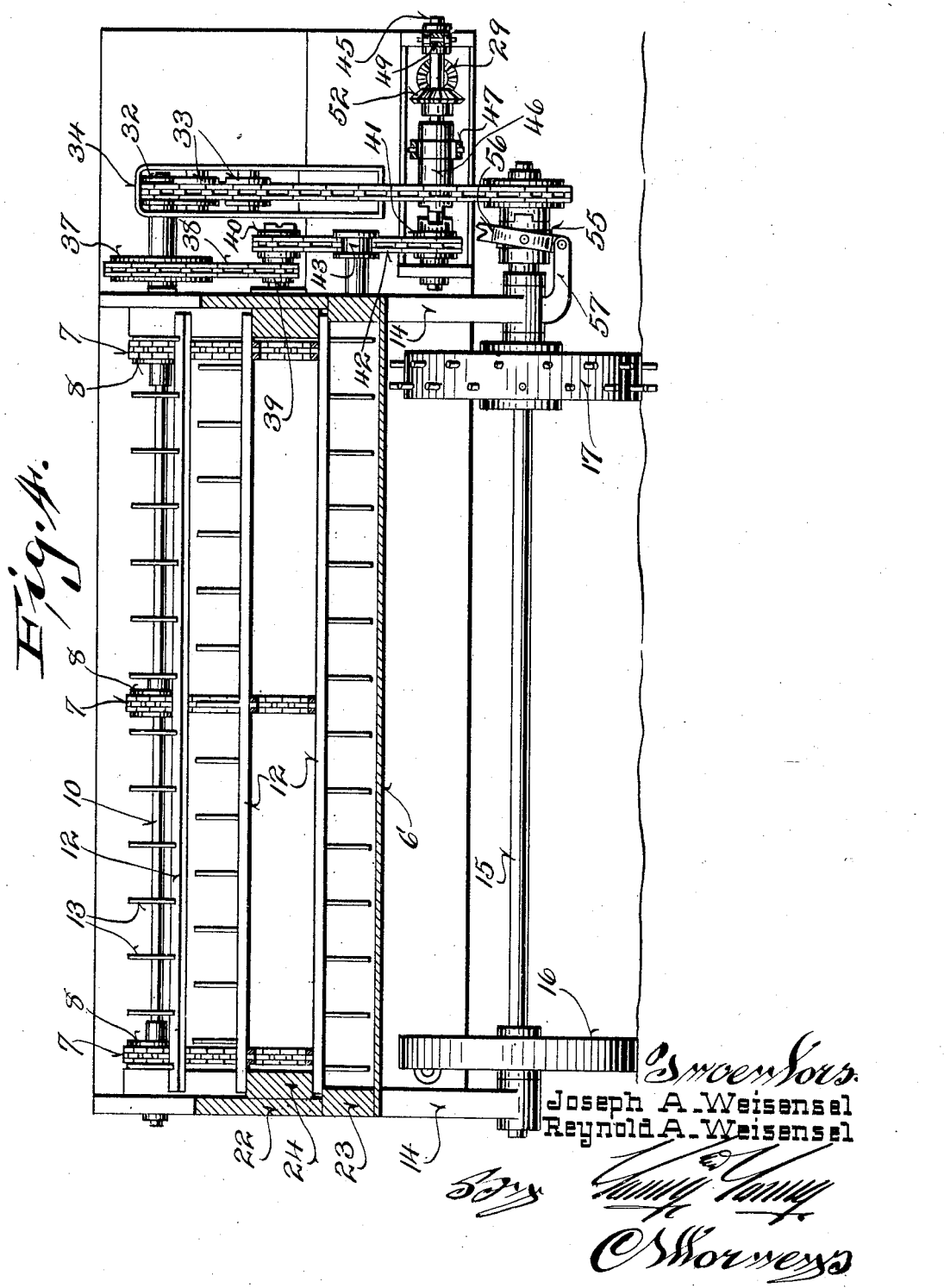

Patented Sept. 24, 1929

1,729,314

UNITED STATES PATENT OFFICE

JOSEPH A. WEISENSEL AND REYNOLD A. WEISENSEL, OF COLUMBUS, WISCONSIN

CLOVER RAKE AND PILER ATTACHMENT FOR MOWERS

Application filed March 10, 1924. Serial No. 698,086.

This invention relates to clover rake and piler attachment for mowers.

In mowing, particularly when such material as clover is mowed, difficulty has been experienced, due to the trampling of the mowed material by the horses, or if a tractor was used, by a packing and crushing of such material, for as these machines have heretofore been used, the horses or tractors travel over the mowed material whenever a fresh swath is cut.

This invention is designed to overcome the above noted defects, and objects of such invention are to provide an attachment for a mowing machine which will receive the mowed material and carry it rearwardly and discharge it immediately behind the mowing machine, so as to leave an unobstructed pathway between the mowed material and the uncut material, so that the mowing machine may, thereafter, travel along this pathway without traveling over the mowed material previously cut.

Further objects are to provide a device which may be readily attached to a standard mowing machine, with a minimum of operations, which will collect the mowed material until a sufficient quantity has been gathered, which will dump this material in a pile behind the mowing machine, and which is provided with controls whereby the operation of the machine and the time at which dumping occurs may be easily controlled by the operator.

An embodiment of the invention is shown in the accompanying drawings, in which:—

Figure 1 is a plan view of the machine showing it attached to a standard type of mower.

Figure 2 is a side elevation of the attachment with parts in section.

Figure 3 is a longitudinal sectional view through the machine, such view corresponding to a section on the line 3—3 of Figure 1.

Figure 4 is a transverse sectional view corresponding to a section on the line 4—4 of Figure 2.

Referring to the drawings, the mowing machine is indicated generally at 1 and is provided with a laterally extending cutter bar provided with a rear stationary portion 2, and a set of reciprocatory knives 3, and is further equipped with the usual guards 4, the guards being customarily held in place by means of bolts 5.

The attachment comprises a main chute 6 having side and bottom walls. A conveyor consisting of a plurality of endless chains 7 is mounted within this chute and above the bottom portion. These chains are carried by upper driving sprocket wheels 8 and by lower sprocket wheels 9, respectively, mounted upon an upper driving shaft 10, and a forward lower idler shaft 11 extending transversely of the chute and journaled adjacent the side walls thereof. These chains are joined at regular intervals by means of a plurality of slats 12 provided with outwardly projecting rods or fingers 13. The positioning of the conveyor and the length of the fingers is such that they just clear the bottom of the main chute 6 and sweep the material upwardly through the chute, as may be clearly seen from Figure 3. The chute is preferably provided at opposite sides with downwardly extending frame members 14 which support a transverse shaft 15 upon which the supporting wheels 16 and 17 are mounted,—the wheel 17 being preferably provided with spikes or cleats to insure a firm grip upon the ground. It is understood, of course, that the wheel 17 constitutes a driving wheel for the transverse shaft 15 and is connected thereto by ratchet mechanism in the usual manner, so that reverse rotation of the wheel is not transmitted to the shaft 15.

The forward end of the chute 6 is detachably and adjustably secured to the cutter bar and is preferably tapered along its forward edge, as indicated at 18, in Figure 1, to accommodate the tapered rear edge of the cutter bar. The attaching means for the chute may consist of a plurality of spaced metallic strap like members 19 which are provided with forward apertures adapted to receive an elongated bolt substituted for one of the bolts 5 of the cutter bar. Its rear portion is provided with an elongated slot 20 through which a bolt 21 extends. By adjusting the bolt 21 in the slot 20, obviously, the exact adjustment of the forward edge of the chute with reference to the cutter bar may be most readily attained, and it is further to be noted that by this construcion no additional holes may be drilled in the cutter bar. The chute 6 is preferably formed with a relatively light bottom 6' of sheet iron, for instance, (see Figures 3 and 4) and with heavier side walls 22. These side walls may be provided with projecting portions 23 adjacent their lower ends, and with spaced projecting portions 24 immediately thereabove. The projecting portions, obviously, may be formed of independent members secured to the side walls, as shown in Figure 4, and they constitute guides upon which the transverse bars 12 of the conveyor travel, and thus accurately position the conveyor with reference to the chute independently of any tendency to sag on the part of the conveyor.

Immediately behind the chute 6 a relatively deep trough 25 is positioned and is preferably supported from such chute. This trough is provided with a conveyor 26 adjacent the bottom portion thereof, as clearly shown in Figures 1, 2 and 3. The conveyor 26 is carried by a driving roller 27 and by an idler roller 28, as shown in Figure 1, the driving roller having a projecting shaft provided with a bevel wheel 29.

The means for driving the conveyors may consist of any suitable mechanism for operatively connecting such conveyors with the shaft 15 and provided with suitable manual controls as, for instance, clutches. In the form shown, the shaft 15 is provided with a sprocket wheel 30 which is connected by means of a chain 31 with an upper sprocket wheel 32 carried by the driving shaft 10 of the longitudinally extending conveyor. This chain is preferably passed over idler rollers 33 carried in a U-shaped yoke member 34 (see Figures 1, 2 and 4). These idler rollers constitute tighteners for the chain, as the yoke portion 34 is adjustably mounted. As shown in Figure 2, the yoke is provided with a web 35 connecting the arms adjacent their lower ends and such web is provided in turn with an elongated slot 36' through which clamping bolts 36 pass, such bolts being carried by the trough 25.

The upper driving shaft 10 carries a sprocket wheel 37 of larger diameter than the sprocket wheel 32 and such wheel is connected by means of the chain 38 with a relatively smaller sprocket wheel 39, as may be seen from Figures 1 and 4. This sprocket wheel is rigidly connected to a larger sprocket wheel 40 which drives a lower sprocket wheel 41 by means of a chain 42, as may be seen from Figures 2 and 4. A tightener 43 is carried by a slide 44 adjustably held to the inner supporting frame or truck frame 14 of the main chute, as shown in Figure 2, and bears against the chain 42. The sprocket wheel 41 is loosely mounted upon a short transverse shaft 45, and is provided with jaws. A clutch member, in the form of a slidable sleeve 46, is splined to the shaft 45 and is provided with cooperating jaws. It is manipulated by means of a yoke piece 47 (see Figures 1 and 4) which, by means of a link 48, is connected with a bell crank lever 49, such lever being in turn connected by means of a link 50 with a foot lever 51. The shaft 45 further carries a bevel gear 52 which meshes with the bevel gear 29, as may be seen from Figure 1. A convenient way of carrying the foot lever is by means of a bracket 53 mounted upon the mowing machine and secured beneath the bolt 54 which retains the seat in position, as may be seen from Figure 1. Any suitable means, such as the spring 51', may be provided for maintaining the clutch open under normal conditions so that the operator may merely temporarily connect the conveyor 26 with the driving wheel 17 of the attachment.

In order to disconnect the entire mechanism from driving relation with the shaft 15, a clutch, indicated generally at 55, (see Figures 1 and 4) is provided. This clutch is operated by means of an upwardly extending lever 56 which has a lower forked portion connected with the movable portion of the clutch, as shown in Figure 4, and pivoted upon a bracket 57 extending outwardly from the supporting frame 14, as clearly shown in Figure 4. A suitable latch 58 may be provided upon the outer side of the chute 6, as shown in Figures 1 and 2, to retain the clutch in open position.

The operation of the machine is as follows: The main clutch 55 is closed and mowing progresses, the mowed material passing upwardly along the chute 6 and discharging into the trough 25. When a sufficient quantity of material has collected in the trough 25, the operator manipulates the foot pedal or lever 51 and due to the multiplying gear ratio of the driving mechanism of the conveyor 26, causes the material to be quickly discharged by such conveyor due to its relative rapid operation. This conveyor discharges the material in a pile directly behind the mowing machine and spaced a material distance outwardly from the uncut or standing material. This process leaves a clear, free path between the mowed and the unmowed material through which the mowing machine may pass when it cuts its next swath on this side of the field. The operator immediately releases the foot pedal 51 after the material has been discharged and allows the trough 25 to again fill before manipulating such foot pedal.

The main chute 6 may be made sufficiently springy and yielding to permit a slight motion of its forward outer corner to permit a slight elevation thereof when the cutter bar is slightly elevated. In other words permitting the forward portion of the chute to occupy a slightly twisted or angular relation to the rear portion thereof when the machine is not in operation, thus spacing the forward end of the chute above the ground a material distance.

When the machine is not in operation and is being drawn through the field, the main clutch 55 is open and both conveyors are rendered inoperative.

This machine fulfills a long felt want in providing a simple means of temporarily retaining the mowed material and depositing it in a pile immediately behind the mower, thus leaving a clear space for the next passage of the mower.

It will also be seen that the attachment may be most readily secured in place with a minimum of operations and that no alteration of a standard mower is required to accommodate such attachment.

Although the invention has been described in considerable detail, it is to be understood that the invention may be variously embodied and is, therefore, to be limited only as claimed.

I claim:

An attachment for a mowing machine having a cutter bar, said attachment comprising a chute adapted for attachment to said cutter bar, said chute being slightly yielding whereby it may twist to allow partial elevation of said cutter bar, an endless conveyor having means extending into said chute and adapted to draw the mowed material along said chute, a wheeled truck for supporting said chute, a second chute extending transversely across the rear end of said first mentioned chute and attached thereto, a conveyor in said second chute, and means for intermittently connecting said last mentioned conveyor with the wheels of said truck.

In testimony that we claim the foregoing we have hereunto set our hands at Columbus, in the county of Columbia, State of Wisconsin, and at Milwaukee, in the county of Milwaukee and State of Wisconsin, respectively.

JOSEPH A. WEISENSEL.
REYNOLD A. WEISENSEL.